United States Patent Office 3,473,570
Patented Oct. 21, 1969

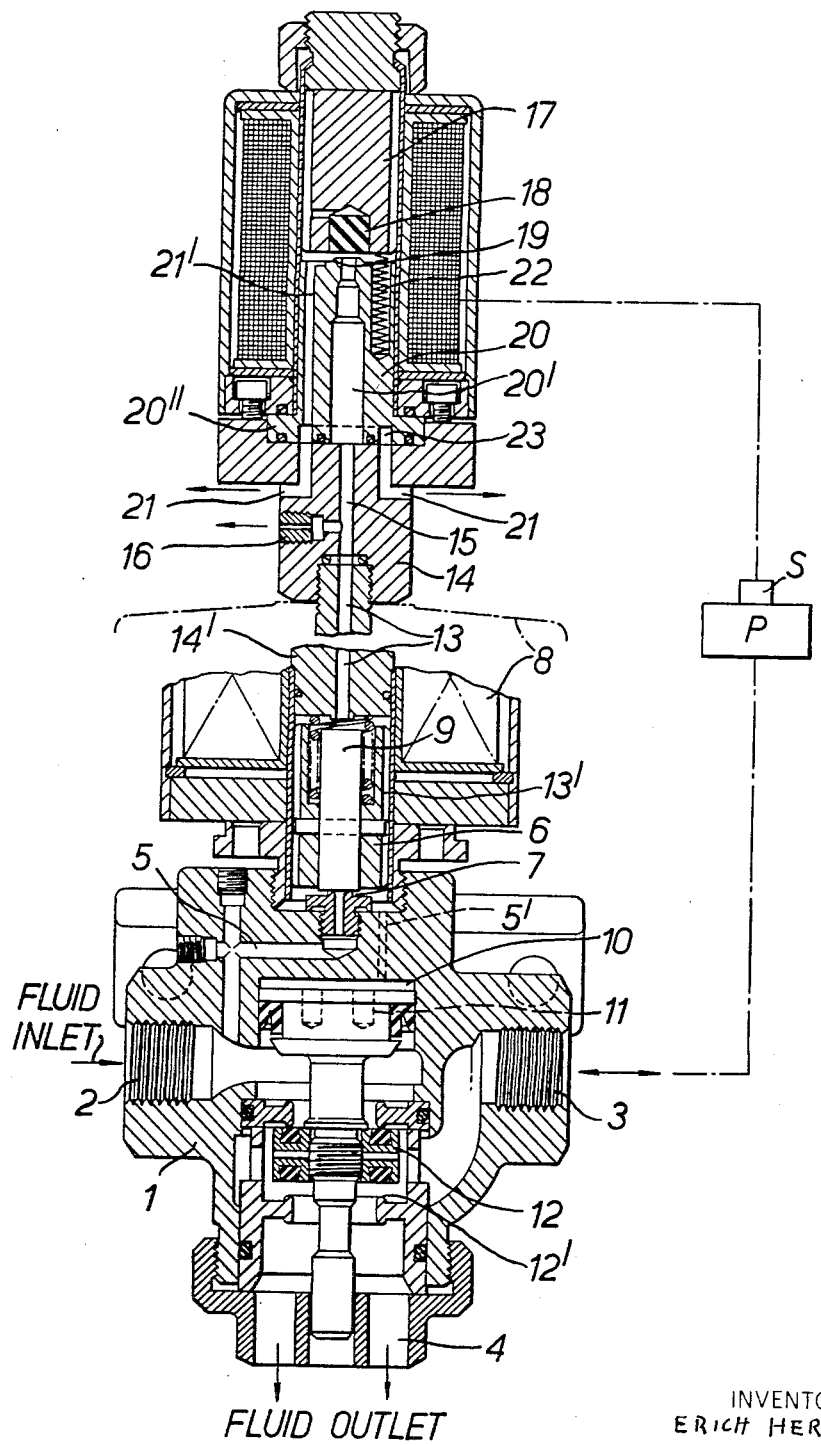

3,473,570
PRESS CONTROL
Erich Herion, Distlerstr. 22, Stuttgart-
Frauenkopf, Germany
Filed Nov. 15, 1967, Ser. No. 683,331
Int. Cl. F15b 20/00
U.S. Cl. 137—625.64                 4 Claims

ABSTRACT OF THE DISCLOSURE

A control system for a press is disclosed with a main valve for the press, a pilot valve controlling the opening and closing of the main valve and having an outlet with a throttle passage, and an auxiliary valve provided in a portion of the outlet bypassing the throttle passage. During the normal operation of the press the flow of fluid from the pilot valve is delayed by the throttle passage, whereas in case of failure of the press the auxiliary valve is actuated and the flow of fluid is effected through the non-throttling portion of the fluid outlet bypassing the throttle passage.

Background of the invention

The present invention relates to a control for a press, especially to the control for the fluid operable brake of such press, by means of a main multiple-way reversing valve with electromagnetic pilot valve reversal. The pilot valve is designed as a three-way valve and performs the build up of the pressure and the retarded or delayed reduction of the pressure by means of throttle passages leading from the working chamber of the reversing piston to the fluid outlet, in order to effect a retarded or delayed braking of the press wheel after the clutch of the press has been disengaged.

With press controls of this type, it has been found that, when the machine is operated with single or individual strokes, the throttling in the outlet passage of the pilot valve brings about the timely braking of the press wheel without an overlapping effect with respect to the actuation of the clutch which is to be effected earlier. This timely braking is also possible during continuous operation of such a press control. However, in case of a disturbance or failure during the continuous operation of the press, the brake does not bring about an immediate standstill of the press under all circumstances and without fail since the throttling in the outlet passage of the pilot valve brings about only a throttled reversal of the main valve in view of the retarded or delayed exhaust or ventilation of the working chamber in front of the reversing piston.

It is an object of the present invention to provide a control for a press, especially a control for the fluid-operated brake of a press, which will overcome the above-mentioned drawbacks.

It is another object of the present invention to provide a press control in which a failure in the control, irrespective of the overlapping between the actuation of the clutch and the brake, brings about an immediate braking of the press.

These and other objects and advantages of the invention will appear more clearly from the following specification, in connection with the accompanying drawing which illustrates the press control of the present invention, in longitudinal section.

The problems underlying the present invention have been solved by a press control in which the throttled outlet passage of the pilot valve has associated therewith in the outlet passage an auxiliary valve having a closing member with non-throttled passage, said closing member being actuated electromagnetically or mechanically by a safety or checking device which is released by the failure or disturbance so as to open up the closing member.

In this way, it is assured that the safety device sensing the failure may immediately enlarge the cross-section of the passage in front of the reversing piston considerably so that a non-throttled reversal and thereby actuation of the brake is made possible.

In conformity with a further development of the present invention, the outlet of the pilot valve has associated therewith an intermediate member with a bore and a throttle member adapted to be inserted therein for normal operation of the press control. A magnetically actuable auxiliary valve may be mounted on top of this intermediate member. During normal operation of the press control, this auxiliary or safety valve is closed. In case of an emergency, however, this auxiliary or safety valve is opened up so that the outlet for the fluid in the working chamber of the main valve is opened up fully while bypassing the throttle passage.

Description of a preferred embodiment

Referring now to the drawing in detail, the control shown therein, comprises a main valve housing 1 having an inlet 2 for a servo or auxiliary fluid medium and a connection at 3 for the fluid consumer of the brake of a press P. The valve housing 1 also comprises a fluid outlet 4 which opens into the atmosphere in the example shown since this press is operated with air under pressure. In case a hydraulic liquid is employed, a reservoir for receiving the hydraulic liquid would have to be provided.

An auxiliary passage 5 branches off inlet 2 and leads to a multiple-way pilot valve 6, in this case, a three-way valve. In the position shown in the drawing, the admission of the servo or auxiliary fluid in passage 5 to valve 6 is blocked at a valve seat 7. If the armature of the valve is actuated by energizing magnet 8 and the resiliently supported closing member 9 is lifted, the auxilary fluid can pass through conduits 5 and 5' into the working chamber 10 of a reversing piston 11. Thus, reversing piston 11 is moved downwardly and moves the double closing member 12 into its lower or closing position against seat 12' so that the brake is connected to the servo or auxiliary fluid supply through passages 2 and 3 past double closing member 12.

When pilot valve 6 is actuated again by deenergizing magnets 8, valve closing member 9 moves into its lower position, the fluid in working chamber 10 will pass through conduit 5' into the outlet conduit 13 of pilot valve 6 via valve passage 13'. Passage 13 is throttled. For this purpose, an intermediate piece 14 is threaded onto member 14' of valve 6. Intermediate member 14 has a longitudinal bore 15 which communicates with the atmosphere through a throttle passage 16 provided in a throttling member inserted into member 14. Thus, during normal operation, the pressure is reduced and the fluid under pressure in working chamber 10 is discharged through passages 13', 13, 15 and 16. In view of the throttled passage 16, the pressure reduction is not immediate but delayed or retarded.

In case a shock-like and immediate actuation of the brake is needed and, therefore, an immediate reversal of the closing member 12 so that an accelerated pressure reduction in working chamber 10 has to be effected, outlet passage 13 has associated therewith a further closing member, which in the embodiment shown in the drawing, consists of a magnetically operable auxiliary valve 17. Valve 17 comprises a closing member 18 adapted to close valve seat 19 of an insert 20 or to open and outlet 21, 21'. Insert 20 is provided with an axial bore 20' forming a continuation of bore 15 in intermediate member or piece 14, and is also provided with a tension spring 22 normally holding closing member 18 in engagement with valve seat 19. The bottom portion 20'' of insert 20 is provided with an annular groove 23 communicating with passages 21 and 21'.

During normal operation of the control, the pilot valve 6 is actuated by energizing magnet 8 while simultaneously the closing member 18 of the auxiliary valve 17 prevents communication between passages 20' and 21'. In case of an emergency, however, the auxiliary valve 17 is energized and instead of the delayed relief of the pressure through passage 16, the full cross section of passages 15, 20' and 21' is available for an accelerated reduction of the pressure. Instead of magnetically releasable auxiliary valve 17, the closing member 18 may also be actuated mechanically by a suitably selected safety or checking device.

As diagrammatically indicated in the drawing, press P is equipped with a safety or checking device S which in case of a failure of the press, energizes auxiliary valve 17 for opening the latter.

What I claim is:

1. In a control system for a press: (a) a main valve having a fluid inlet, a passage for connection to a press, a valve piston chamber, and a valve piston in said chamber for selectively establishing and interrupting communication between said fluid inlet and said passage; (b) a pilot valve having a fluid inlet, a conduit leading from said last-mentioned inlet into said chamber, a fluid outlet, and means movable from a first position establishing communication between the inlet of the pilot valve and the conduit and interrupting communication between the chamber and the outlet to a second positon for establishing communication between the chamber and the outlet and interrupting communication between the inlet in the pilot valve and the outlet; (c) a throttle passage in the outlet for normally discharging the fluid therethrough; (d) a branch line branching off the outlet, bypassing said throttle passage and having a cross section larger than the throttle passage; and (e) an auxiliary valve in the branch line including means for normally blocking the branch line and for opening the branch line for discharging the fluid therethrough in response to a failure in the press.

2. A control system according to claim 1, wherein said pilot valve comprises a valve body, wherein said throttle passage is formed by a member inserted into said body and communicating with said outlet, and wherein said auxiliary valve is a magnetically controlled valve arranged on said pilot valve body.

3. A control system according to claim 1, wherein said auxiliary valve is arranged on said pilot valve and comprises an insert with a bore communicating with said outlet and with an end portion forming a valve seat, said means for blocking said branch line including a closing member, and spring means normally pressing said closing member into sealing engagement with said valve seat.

4. A control system according to claim 3, wherein said insert is provided with peripheral longitudinal grooves for discharging the fluid from the branch line.

References Cited
UNITED STATES PATENTS 2,993,510  7/1961  Collins _____ 137—625.64

HENRY T. KLINKSIEK, Primary Examiner

U.S. Cl. X.R.

251—130